US010841122B1

(12) United States Patent
Jensen et al.

(10) Patent No.: US 10,841,122 B1
(45) Date of Patent: Nov. 17, 2020

(54) AUTOMATIC CUSTOM RULE GENERATION FOR HOME AUTOMATION SYSTEM

(71) Applicant: Vivint, Inc., Provo, UT (US)

(72) Inventors: Gavin Jensen, Lehi, UT (US); Nic Brunson, Salt Lake City, UT (US); Matthew Mahar, South Jordan, UT (US); Jeremy B. Warren, Draper, UT (US); Brandon Bunker, Highland, UT (US); Rongbin Lanny Lin, Draper, UT (US); Nicholas Brown, Draper, UT (US)

(73) Assignee: Vivint, Inc., Provo, UT (US)

( * ) Notice: Subject to any disclaimer, the term of this patent is extended or adjusted under 35 U.S.C. 154(b) by 33 days.

(21) Appl. No.: 15/667,446

(22) Filed: Aug. 2, 2017

(51) Int. Cl.
*H04L 12/28* (2006.01)
*H04L 12/24* (2006.01)

(52) U.S. Cl.
CPC ...... *H04L 12/2816* (2013.01); *H04L 12/2827* (2013.01); *H04L 41/0883* (2013.01)

(58) Field of Classification Search
CPC ............. H04L 12/2816; H04L 12/2827; H04L 41/0883
See application file for complete search history.

(56) References Cited

U.S. PATENT DOCUMENTS

| | | | |
|---|---|---|---|
| 8,504,921 B2 | 8/2013 | Wilson et al. | |
| 8,581,439 B1 | 11/2013 | Clayton et al. | |
| 2008/0079569 A1* | 4/2008 | Axelsen | G06Q 10/10 340/541 |
| 2012/0105214 A1* | 5/2012 | Sanders | H04L 67/12 340/10.42 |
| 2015/0074259 A1 | 3/2015 | Ansari et al. | |
| 2015/0160797 A1 | 6/2015 | Shearer et al. | |
| 2015/0163412 A1* | 6/2015 | Holley | G05B 15/02 348/143 |
| 2016/0189532 A1* | 6/2016 | Malhotra | G08B 29/185 340/506 |
| 2016/0202677 A1 | 7/2016 | Trundle et al. | |
| 2016/0234184 A1* | 8/2016 | Liu | G06F 16/24 |
| 2016/0247364 A1* | 8/2016 | Herman | G06F 3/165 |
| 2018/0349447 A1* | 12/2018 | MacCartney | G06F 16/24578 |

* cited by examiner

*Primary Examiner* — Chris Parry
*Assistant Examiner* — Abderrahmen Chouat
(74) *Attorney, Agent, or Firm* — Holland & Hart, LLP

(57) ABSTRACT

Methods ad systems are described for generating custom rules for device operation in a home environment. A method includes monitoring an activity in home environment via one or more sensors, generating a recommended action associated with the at least one device based on the monitored activity, receiving user input regarding the recommended action, determining a trend based on the received user input, and adjusting performance of the at least one device based on the determined trend.

20 Claims, 7 Drawing Sheets

AUTOMATIC CUSTOM RULE GENERATION FOR HOME AUTOMATION SYSTEM

BACKGROUND

The present disclosure, for example, relates to security and/or automation systems, and more particularly to custom rule generation for device performance in a home environment.

Security and automation systems are widely deployed to provide various types of communication and functional features such as monitoring, communication, notification, and/or others. These systems may be capable of supporting communication with a user through a communication connection or a system management action.

Some systems may be capable of monitoring devices within the home environment, such as whether the device is operating or not. In some cases a user may wish to adjust the performance of these devices without having to physically operate these devices or without requiring excessive interaction with the devices or the home environment.

SUMMARY

Methods and systems are described for custom rule generation and device operation and adjustment by a home automation system. The home automation system may be connected to various devices throughout the home environment, where the home automation system may have the ability to monitor and control the operation of these devices. The home automation system may determine an optimal operation of the device based on the monitoring of its operation and subsequently inform a user of the optimal operation via a generated notice. The user may provide input back to the home automation system that is associated with the optimal performance, of which the home automation system may alter the device performance based on the user input. The home automation system may also detect a pattern with the received user input based on the circumstances surrounding the generated notification and may subsequently alter the operation of the device based on the determined pattern and without the need for further user input.

A method for security and/or automation systems is described. The method may include monitoring activity in a home environment based on one or more sensors, generating a recommended action associated with at least one device in the home environment based on the monitored activity, receiving user input based on the generated recommended action, determining a trend based on the received user input, and adjusting performance of the at least one device in the home environment based on the determined trend.

Another apparatus for security and/or automation systems is described. The apparatus may include a processor, memory in electronic communication with the processor, and instructions stored in the memory. The instructions may be operable to cause the processor to monitor activity in a home environment based on one or more sensors, generate a recommended action associated with at least one device in the home environment based on the monitored activity, receive user input based on the generated recommended action, determine a trend based on the received user input, and adjust performance of the at least one device in the home environment based on the determined trend.

A non-transitory computer readable medium for security and/or automation systems is described. The non-transitory computer-readable medium may include instructions operable to cause a processor to monitor activity in a home environment based on one or more sensors, generate a recommended action associated with at least one device in the home environment based on the monitored activity, receive user input based on the generated recommended action, determine a trend based on the received user input, and adjust performance of the at least one device in the home environment based on the determined trend.

Some examples of the method, apparatus, and non-transitory computer-readable medium described above may further include processes, features, means, or instructions for generating a custom rule for the home environment based on the determined trend.

In some examples of the method, apparatus, and non-transitory computer-readable medium described above, the recommended action may be generated from a set of recommended actions. Some examples of the method, apparatus, and non-transitory computer-readable medium described above may further include processes, features, means, or instructions for updating the set of recommended actions based on the received user input.

Some examples of the method, apparatus, and non-transitory computer-readable medium described above may further include processes, features, means, or instructions for receiving a user confirmation of the determined trend, wherein adjusting the performance of the at least one device in the home environment may be based on the received user confirmation.

In some examples of the method, apparatus, and non-transitory computer-readable medium described above, the recommended action may be generated on a user interface.

In some examples of the method, apparatus, and non-transitory computer-readable medium described above, the user input comprises context data associated with the at least one device, a characterization of the monitored activity, or a combination thereof. In some examples of the method, apparatus, and non-transitory computer-readable medium described above, the context data comprises a device identifier, a device type, a device location, or a combination thereof.

Some examples of the method, apparatus, and non-transitory computer-readable medium described above may further include processes, features, means, or instructions for adjusting the performance of the at least one device comprises adjusting a power level of the at least one device, initiating an action of the at least one device, ceasing an action of the at least one device, adjusting a performance threshold of the at least one device, or a combination thereof.

In some examples of the method, apparatus, and non-transitory computer-readable medium described above, adjusting the performance of the at least one device further comprises: automatically adjusting the performance of the at least one device based on the generated recommended action. Some examples of the method, apparatus, and non-transitory computer-readable medium described above may further include processes, features, means, or instructions for readjusting the performance of the at least one device based on the received user input.

Some examples of the method, apparatus, and non-transitory computer-readable medium described above may further include processes, features, means, or instructions for monitoring the activity in the home environment further comprising detecting a power output of an appliance, detecting a radio frequency communication emitted from the appliance, sensing biometric data, detecting noise levels, or a combination thereof.

In some examples of the method, apparatus, and non-transitory computer-readable medium described above, the user input comprises a set of inputs received over a predetermined period.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
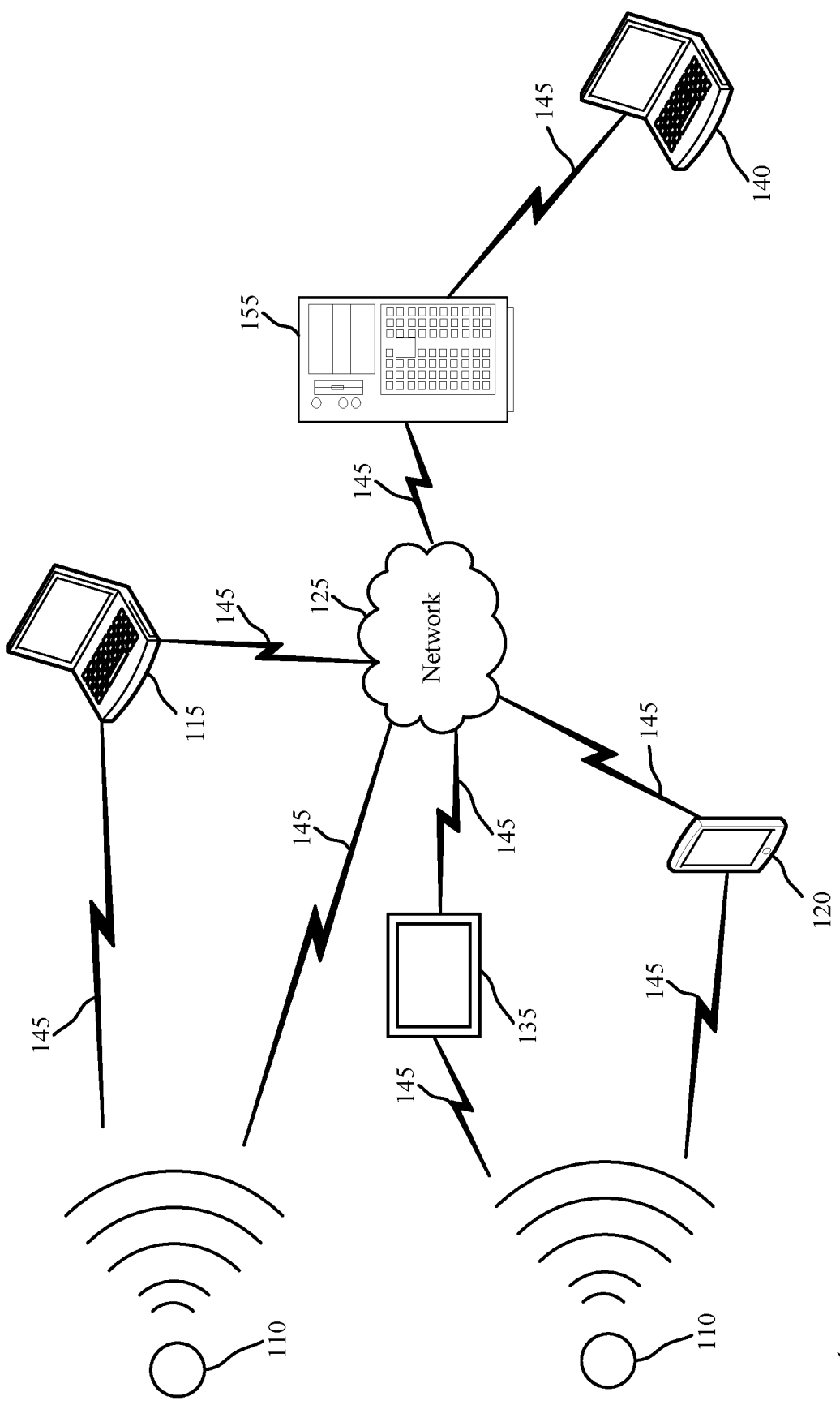
FIG. 1 is a block diagram of an example of a security and/or automation system in accordance with various embodiments.

Some home automation systems allow for connecting to various devices and controlling these devices based on user preferences and/or manufacturer-selected preferences. For example, the home automation system may receive manual input from a user in order to turn a light on at certain hours of the day. The home automation system may then turn the light on at designated times throughout the day. However, the performance of these controlled devices may not follow optimal procedures (i.e., power efficiency) while under these directed routines and may not account for changes in behavior or may rely on manual input. Further, in some situations, the user may feel the need to override these routines from time to time.

Some home automation systems allow for the system to control the operation of various devices in a home environment, for example, lights, HVAC, and security devices, where the operation of these devices may be based on input received from a user or manufacturer-selected preferences. In some situations, the home automation system may notify a user of the operation of a device in the home environment. For example, a user may be notified when a device is operating counter to a user or manufacturer preference. In this situation, the user may elect to alter the operation of the device based on various user preferences. However, these notifications may in the aggregate become inefficient and cumbersome for a user to manage. Users may wish to avoid these excessive notifications while still maintaining the ability to override the operation of home devices.

The systems and methods described herein relate to home automation and home security, and related security systems and automation for use in commercial and business settings. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

One aspect of the present disclosure relates to systems and methods for generating custom rules using a home automation system. The systems and methods described herein facilitate monitoring activities of devices in a home environment by the home automation system, determining an optimal performance of the devices, and generating a notice to a user recommending actions related to the devices. The user may provide feedback to the home automation system based on the notice, and the home automation system may learn a pattern based on the user feedback. Thus, in future situations regarding the performance of the devices, the home automation system may adjust the operation of the devices based on the learned pattern, rather than seeking further input from the user.

Various aspects of a device may be monitored or altered by the home automation system. For example, the power output of the device, the speed of a mechanism associated with the device, a temperature, a noise output, a radio frequency emission, an open or closed state of a barrier, etc., may be monitored and/or altered based on the received user feedback. Further, these aspects may be monitored via various sensors connected to the home automation system. Examples of sensors may include occupancy sensors, power output sensors, noise sensors, radio frequency sensors, etc.

In some examples, contextual data may be provided by the user. Examples of contextual data includes a name of a device, a location of a device, etc. The contextual data may be provided with or apart from a response to a notice generated by the home automation system, or the contextual data may be provided as part of a response. Additionally or alternatively, the contextual data may be provided by a device, such as when the device establishes a connection with one or more components of the home automation system automatically, based on user input, or based on other factors. Subsequently, the home automation system may use this contextual data in order to either adjust the performance of a device after generating a notice, or the home automation system may use the contextual data to generate the notice recommending an action associated with a device.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication component The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based components (e.g., DSP, FPGA, ASIC) and/or software-based components (e.g., a component of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output component may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more sensor units 110 may be sensors configured to conduct periodic or ongoing automatic measurements related to monitoring the activities of various devices in a home environment. Each sensor unit 110 may be capable of sensing multiple device activity parameters, or alternatively, separate sensor units 110 may monitor separate device activity parameters. For example, one sensor unit 110 may measure power output, while another sensor unit 110 (or, in some embodiments, the same sensor unit 110) may detect radio frequency emissions. In some embodiments, one or more sensor units 110 may additionally monitor alternate device activity parameters, such as biometric data. In alternate embodiments, a user may input contextual data directly at the local computing device 115, 120 or at remote computing device 140. For example, a user may enter device identity data into a dedicated application on his smart phone indicating the functions or the type of device.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smart phone. Where local computing device 115, 120 is a smart phone, the smart phone may have a dedicated application directed to collecting sensor data and calculating a recommended action therefrom. The local computing device 115, 120 may process the data received from the one or more sensor units 110 to determine a recommended action associated with devices in the home environment. These recommended actions may be stored in the local computing device 115, 120 and may be provided by the manufacturer, or the local computing device 115, 120 may generate recommended actions based on predefined conditions, such as a focus that a device in the home environment be power efficient based on home occupancy data. In alternate embodiments, remote computing device 140 may process the data received from the one or more sensor units 110, via network 125 and server 155, to generate a recommended action. Data transmission may occur via, for example, frequencies appropriate for a personal area network (such as BLUETOOTH® or IR communications) or local or wide area network frequencies such as radio frequencies specified by the IEEE 802.15.4 standard.

Local computing device 115, 120 may also transmit the determined recommended action to a device associated with a user directly, through control panel 135, and/or remote computing device 140. In response, a user may provide feedback related to the determined recommended action. The feedback may be received at local computing device 115, 120, control panel 135, and/or through server 155, where these devices may individually or in some combination subsequently determine a trend of received user feedback. In some examples, at least one of these devices may generate at least one custom rule related to the functioning of one or more devices within the home environment and initiate the custom rule and/or implement device adjustment based on the custom rule, sensor data, at least one user preference, other information, or some combination.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120. Local computing device 115, 120 may also communicate with various devices within a home environment. For example, local computing device 115, 120 may, in addition to or as an alternative to relying on sensor units 110 for sensed data, receive data from devices directly via network 125. Local computing device 115, 120 may also receive contextual data directly from these devices, and additionally or alternatively transmit operation commands to these devices to adjust or initiate adjustment of one or more performances and/or parameters of the devices.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of device radio frequency emission data from a sensor unit 110, a stream of device power output data from the same or a different sensor unit 110, and a stream of user occupancy data from either the same or yet another sensor unit 110. In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory) containing device activity data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
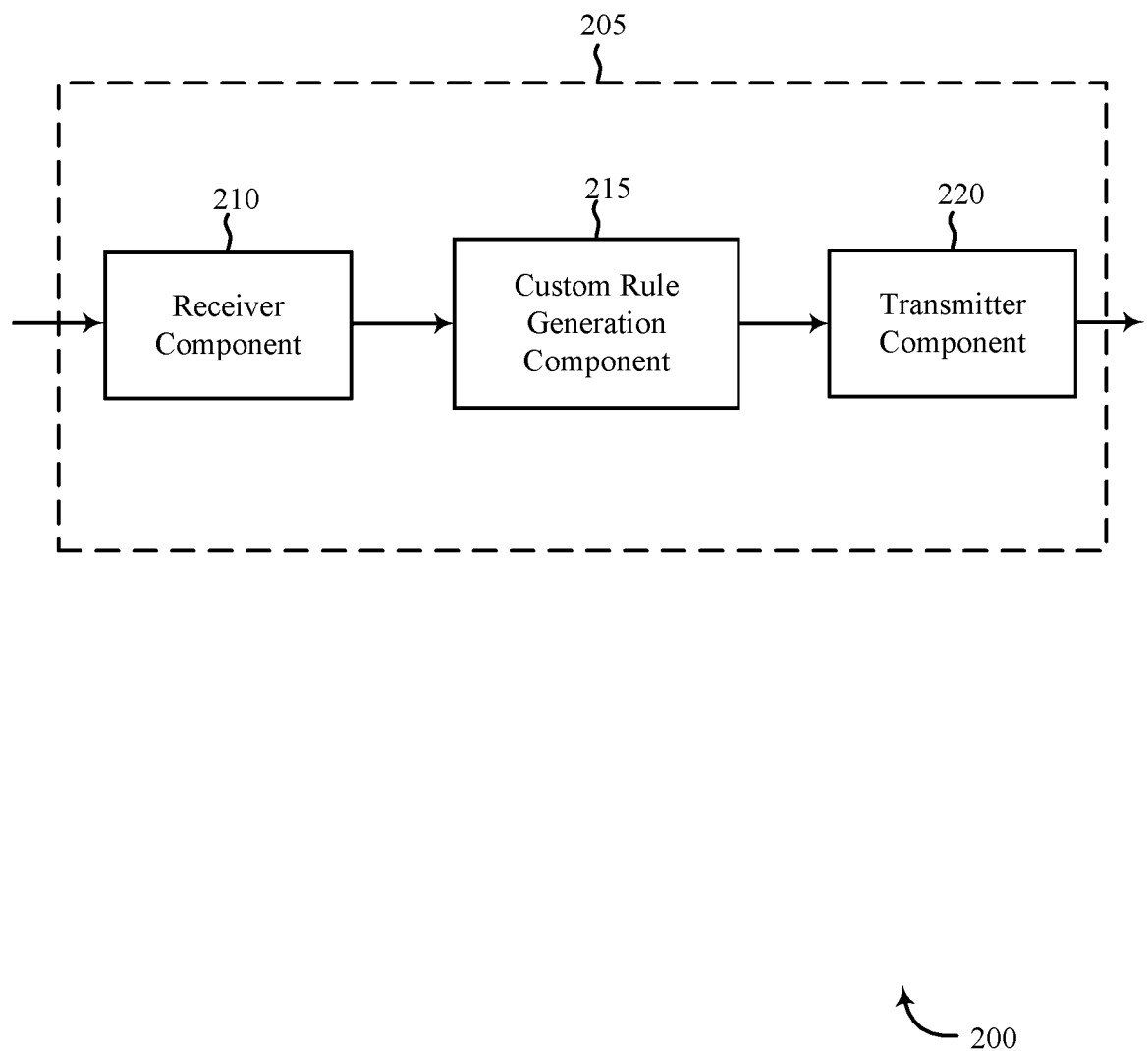
FIG. 2 shows a block diagram of a device relating to a security and/or automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 135 described with reference to FIG. 1. The control panel 205 may include a receiver component 210, a custom rule generation component 215, and/or a transmitter component 220. The control panel 205 may also be or include a processor. Each of these components may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

The receiver component 210 may receive information such as packets, user data, device data, and/or control information associated with various information channels (e.g., control channels, data channels, etc.). The receiver component 210 may be configured to receive device activity data, such as from sensor units 110 of FIG. 1. Receiver may also be configured to receive contextual data and/or user input from various users. Information may be passed on to the custom rule generation component 215, and to other components of the control panel 205.

The custom rule generation component 215 may receive device activity data from the receiver component 210 and may determine a recommended action regarding at least one device in a home environment based on the received device activity data. The custom rule generation component 215 may categorize data (e.g., device activity data, sensor data) based on the type of data received, which sensor unit 110 transmitted the device activity data, and/or the location of the origin of the device activity data, among other options. Additionally or alternatively, the custom rule generation component 215 may correlate different sets of received device activity data, for example, upon a determination that the different sets of device activity data may be from the same device, different devices, different devices at different locations, from a same or a different device type, or some combination thereof. Additionally, the custom rule generation component 215 may weigh the categorized data based on a set of device settings (e.g., preconditions), where, in some examples, correlated device activity data may be weighed similarly to one another, or other data stored by the system. The set of device preconditions may, in some examples, be a set of weights and may be provided by the manufacturer or may be provided or modified by the user and/or by one or more devices of the home environment based on information (e.g., user preferences, user data, device type, device location, etc.). The set of device preconditions may allow the custom rule generation component 215 to emphasize and deemphasize various aspects of the received device activity data based on a user's preferences, goals, responses to prompts, user input, device type, device location, etc. For example, power output data may be weighed more heavily than noise emission data in a system where power efficiency is emphasized.

Based on these weighted and/or correlated sets of activity data, the custom rule generation component 215 may determine a recommended action regarding a device. The recommended action may be generated by the custom rule generation component 215, or the custom rule generation component 215 may select the recommended action from a set of stored recommended actions. The recommended action may then be transferred to the transmitter component 220 in order for the recommended action to be transmitted to a user.

The custom rule generation component 215 may also receive user input from the receiver component 210 regarding the recommended action. The received user input may be a response to the recommended action, (i.e., agreeing with the recommended action, disagreeing with the recommended action, or modifying the recommended action). Additionally or alternatively, the received user input may include context data, which may be related to characteristics of the device which the recommended action pertains to, or to characteristics of the activity being monitored by sensor units 110. Examples of context data may include a device ID, a device type, a location of a device, or an identification of the activity being monitored.

In an example, context data may include a device ID. This device ID may be in the form of an identification number provided either by the manufacturer, the system, or by the user. For example, the device ID of a device in the system may be a production serial number provided by the manufacturer. Once the custom rule generation component 215 receives this serial number, the custom rule generation component 215 may then discover the make and model of the device, as well as other characteristics pertaining to its operation, such as recommended power output, estimated life span, etc.

In another example, context data may include a device type. A device type may allow the custom rule generation component 215 to estimate general activity types that the device may be associated with, as well as general ranges of operation the device may operate in. The device type information may be provided by a user, for example, by naming the device. The custom rule generation component 215 may also categorize the associated device based on this device type information (e.g., naming a device "porchlight" allows the custom rule generation component 215 to determine the activities and operating range of the device, as well as categorizing the device as a "light").

In yet another example, a location of the device may be used as context data. A device location may allow the custom rule generation component 215 to determine what type of device may be involved, or the device's proximity to a monitored activity or other devices in the area. The location of the device may be determined based on communications received from the device, user input providing information of the location, or by the system sensing the location of the device (e.g., via GPS monitoring, triangularization of various signals emitted from the device, etc.).

In yet a further example, the context data may be characterizations of the activity being monitored. The characterizations may be used to connect the activity with associated devices, to be categorized with similar activities, or to correlate associated devices with other devices. For example, a user may provide input indicating that the monitored activity is "TV Noise." Based on this data, the custom rule generation component 215 may determine that the TV in the family room is the source of the monitored activity, and may subsequently categorize the monitored activity in the "Noise Emission" category.

In other embodiments, context data provided to the custom rule generation component 215 may be used to determine the recommended action, rather than as received in response to the recommended action. For example, the custom rule generation component 215 may receive device type information, such as a serial number of the device. The custom rule generation component 215 may then determine various weights to provide to the monitored activity associated with the device based on what type of device it is. In another example, the custom rule generation component 215 may correlate the monitored activity based on the device's determined location and its proximity to other devices in the area (e.g., a room in a house).

The custom rule generation component 215 may determine a trend based on the received user input. The custom rule generation component 215 may log the number of times a user has been provided a recommended action pertaining to a certain activity, device, or a combination thereof. The custom rule generation component 215 may also log the user input for each of these recommended actions. The custom rule generation component may then correlate the received user inputs to determine the trend. The determined trend may be based on a single input, multiple inputs, or inputs received over a predetermined period of time. In some cases, the determined trend may be refined over time.

For example, in a case where user input is received for a related activity, the custom rule generation component may take this into account for a previously determined trend and adjust the previously determined trend based on this new user input. In the case of a determined trend based on a single current user input, the custom rule generation component 215 may collect archived user input received for other recommended actions, for example if the custom rule generation component 215 determines a correlation between the archived recommended action and the current recommended action. Then, the archived user input and the single current user input may be weighed and correlated as if the archived user input and the single user input were received for the same recommended action. The trend may be associated with the activity monitored, the device of focus in the recommended action, or a combination thereof. Additionally or alternatively, the determined trend may be associated with other devices in the home environment, for example similar device types of the device of focus in the recommended action, or a combination of similar device types of the device of focus in the recommended action as well as the device of focus in the recommended action.

In some embodiments, the custom rule generation component 215 may generate a custom rule for the home environment based on the determined trend. The custom rule may pertain to the device of focus in the recommended action, devices associated with the monitored activity, or a combination thereof. Additionally or alternatively, the custom rule may be associated with other devices in the home environment, for example similar device types of the device of focus in the recommended action. The custom rule generation component 215 may then adjust the performance of at least some of the devices associated with the custom rule (e.g., devices related to generation of the custom rule, devices affected by the custom rule) without requiring any further user feedback or permission. Additionally, the custom rule generation component 215 may adjust the performance of these devices according to the generated custom rule without notifying the user of such adjustment.

In some embodiments, the custom rule generation component 215 may automatically adjust performance of a device based on the recommended action. In these embodiments, the performance of the device is adjusted prior to receiving user input associated with the recommended actions. Additionally, the custom rule generation component 215 may adjust the performance of the device once again after receipt of user input associated with the recommended action or after generation of a custom rule.

The transmitter component 220 may transmit the one or more signals received from other components of the control panel 205. The transmitter component 220 may transmit recommended actions to a user, as well as sensed data from sensor units 110. In some examples, the transmitter component 220 may be collocated with the receiver component 210 in a transceiver component.

Figure 3:
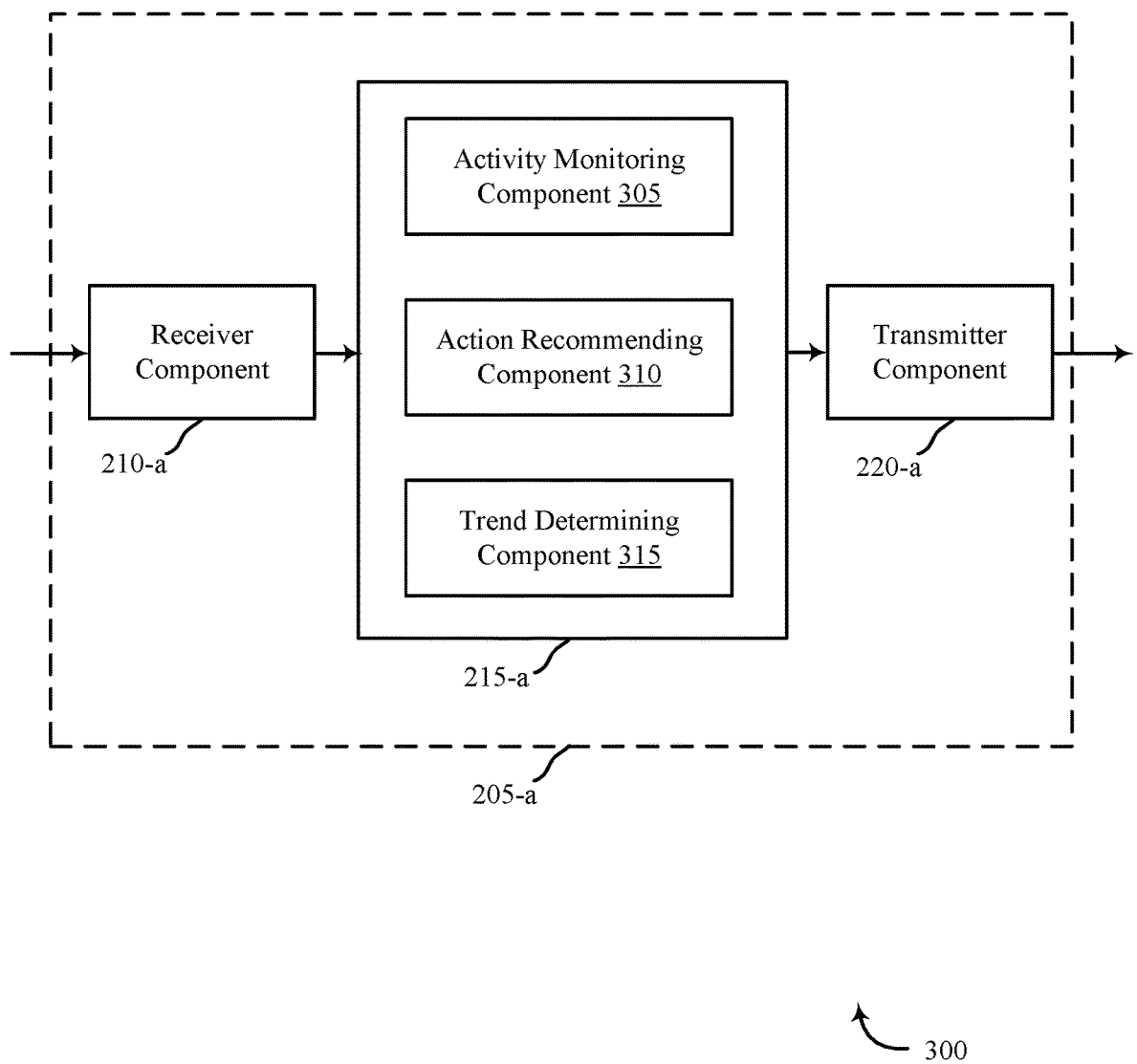
FIG. 3 shows a block diagram of a device relating to a security and/or automation system, in accordance with various aspects of this disclosure.

FIG. 3 shows a block diagram 300 of a control panel 205-*a* for use in wireless communication, in accordance with various examples. The control panel 205-*a* may be an example of one or more aspects of a control panel 105 described with reference to FIG. 1. It may also be an example of a control panel 205 described with reference to FIG. 2. The control panel 205-*a* may include a receiver component 210-*a*, a custom rule generation component 215-*a*, and/or a transmitter component 220-*a*, which may be examples of the corresponding components of control panel 205. The control panel 205-*a* may also include a processor. Each of these components may be in communication with each other. The custom rule generation component 215-*a* may include activity monitoring component 305, action recommending component 310, and trend determining component 315. The receiver component 210-*a* and the transmitter component 220-*a* may perform the functions of the receiver component 210 and the transmitter component 220, of FIG. 2, respectively.

The components of the control panel 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

Activity monitoring component 305 may monitor an activity in a home environment. The activity monitoring component 305 may monitor the activity via received data from sensor units 110. The activity monitoring component 305 may additionally determine activity to monitor from user input, stored sets of activities, or from a determination of which sensing units are within the home environment.

Action recommending component 310 may generate a recommended action based on the monitored activity. The recommended action may be from a set of stored recommended actions. Alternatively, the action recommending component 310 may derive the recommended action from a set of device preconditions, such as an emphasis that devices within the home environment operate at optimal efficiency.

Trend determining component 315 may determine a trend based on user input associated with the recommended action. The trend determining component 315 may determine the trend based on a single input, multiple inputs, or inputs received over a predetermined period of time. The determined trend may be associated with the activity monitored, the device of focus in the recommended action, or a combination thereof. Additionally or alternatively, the determined trend may be associated with other devices in the home environment, for example similar device types of the device of focus in the recommended action, or a combination of similar device type of the device of focus in the recommended action as well as the device of focus in the recommended action.

In an example, receiver component 210-*a* may receive activity data in the form of power output from a particular wall outlet in a home. The power output may be sensed over a predefined time period, for example a week. In some situations, this power output will likely fluctuate based on the occupancy of the home, the time of day, other devices in use, etc. Based on this sensed power output, the custom rule generation component 215-*a* may determine that the device associated with the sensed power output may be running inefficiently and generate a recommended action that turns off the device during certain periods of the day. In some cases, the custom rule generation component 215-*a* may further determine that the associated device is a light bulb, based on other sensed data. The transmitter component 220-*a* may transmit this recommended action to a user, which may in turn provide feedback related to the recommended action. The receiver 210-*a* may receive this input, and the input may be accepting the recommended action.

In some cases, the user may feel it is unnecessary to turn off this device at those times, and may simply reject the recommended action. Or, the user may modify the recommended action based on user preferences. The custom rule generation component 215-*a* may receive this input and, based on previous inputs received for similar recommended actions, the same recommended action, or by itself, determine a trend based on the recommended action. For example, the custom rule generation component 215-*a* may determine that the user always approves of recommended actions recommending the device emitting the power output to be turned off at certain periods of the day. Based on this determined trend, the custom rule generation component 215-*a* may subsequently turn off the device during those certain time periods without further requesting input from the user. In some other examples, the determined trend may be expanded to include similar devices to be turned off during certain time periods, which the custom rule generation component 215-a will then turn off those multiple devices without receiving user input. In this example, the custom rule generation component 215-a may thus alter the performance of devices in which user input may not be directly received for.

Figure 4:
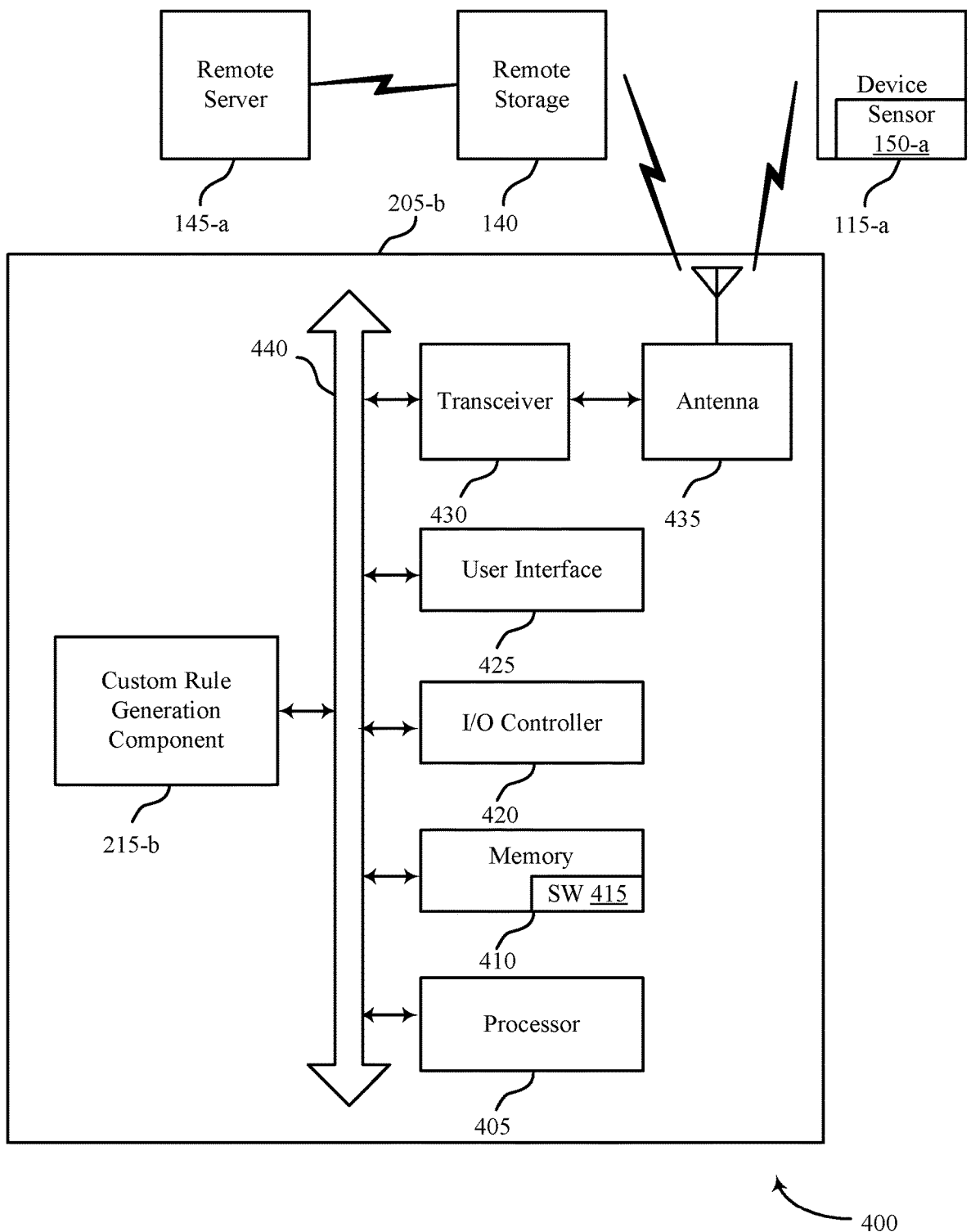
FIG. 4 shows a block diagram relating to a security and/or automation system, in accordance with various aspects of this disclosure.

FIG. 4 shows a system 400 for use in home automation systems, in accordance with various examples. System 400 may include a control panel 205-b, which may be an example of the control panel 105 of FIG. 1. Control panel 205-b may also be an example of one or more aspects of control panels 205 and/or 205-a of FIGS. 2 and 3.

Control panel 205-b may include components for bi-directional voice and data communications including components for transmitting communications and components for receiving communications. For example, control panel 205-b may communicate bi-directionally with one or more of device 115-a, one or more sensors 150-a, remote storage 140, and/or remote server 145-a, which may be an example of the remote server of FIG. 1. This bi-directional communication may be direct (e.g., control panel 205-b communicating directly with remote storage 140) or indirect (e.g., control panel 205-b communicating indirectly with remote server 145-a through remote storage 140).

The custom rule generation component 215-b may generate custom rules for operation of devices in a home environment based on received user input in response to a recommended action as described above with reference to FIGS. 1-3.

Control panel 205-b may also include a processor component 405, and memory 410 (including software/firmware code (SW) 415), an input/output controller component 420, a user interface component 425, a transceiver component 430, and one or more antennas 435 each of which may communicate—directly or indirectly—with one another (e.g., via one or more buses 440). The transceiver component 430 may communicate bi-directionally—via the one or more antennas 435, wired links, and/or wireless links—with one or more networks or remote devices as described above. For example, the transceiver component 430 may communicate bi-directionally with one or more of device 115-a, remote storage 140, and/or remote server 145-a. The transceiver component 430 may include a modem to modulate the packets and provide the modulated packets to the one or more antennas 435 for transmission, and to demodulate packets received from the one or more antenna 435. While a control panel or a control device (e.g., 205-b) may include a single antenna 435, the control panel or the control device may also have multiple antennas 435 capable of concurrently transmitting or receiving multiple wired and/or wireless transmissions. In some embodiments, one element of control panel 205-b (e.g., one or more antennas 435, transceiver component 430, etc.) may provide a direct connection to a remote server 145-a via a direct network link to the Internet via a POP (point of presence). In some embodiments, one element of control panel 205-b (e.g., one or more antennas 435, transceiver component 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver component 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to some element of system 400 via a network using one or more wired and/or wireless connections.

In some embodiments, the user interface component 425 may include an audio device, such as an external speaker system, an external display device such as a display screen, and/or an input device (e.g., remote control device interfaced with the user interface component 425 directly and/or through I/O controller component 420).

One or more buses 440 may allow data communication between one or more elements of control panel 205-b (e.g., processor component 405, memory 410, I/O controller component 420, user interface component 425, etc.).

The memory 410 may include random access memory (RAM), read only memory (ROM), flash RAM, and/or other types. The memory 410 may store computer-readable, computer-executable software/firmware code 415 including instructions that, when executed, cause the processor component 405 to perform various functions described in this disclosure (e.g., determining a trend based on received user input, generating a custom rule associated with a device based on the determined trend, etc.). Alternatively, the software/firmware code 415 may not be directly executable by the processor component 405 but may cause a computer (e.g., when compiled and executed) to perform functions described herein. Alternatively, the computer-readable, computer-executable software/firmware code 415 may not be directly executable by the processor component 405 but may be configured to cause a computer (e.g., when compiled and executed) to perform functions described herein. The processor component 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the custom rule generation component 215-b that implements the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver component 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio component, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller component 420 may be iOS®, ANDROID®, MS-DOS®, MS-WINDOWS®, OS/2®, UNIX®, LINUX®, or another known operating system.

The transceiver component 430 may include a modem configured to modulate the packets and provide the modulated packets to the antennas 435 for transmission and/or to demodulate packets received from the antennas 435. While the control panel or control device (e.g., 205-b) may include a single antenna 435, the control panel or control device (e.g., 205-b) may have multiple antennas 435 capable of concurrently transmitting and/or receiving multiple wireless transmissions.

Figure 5:
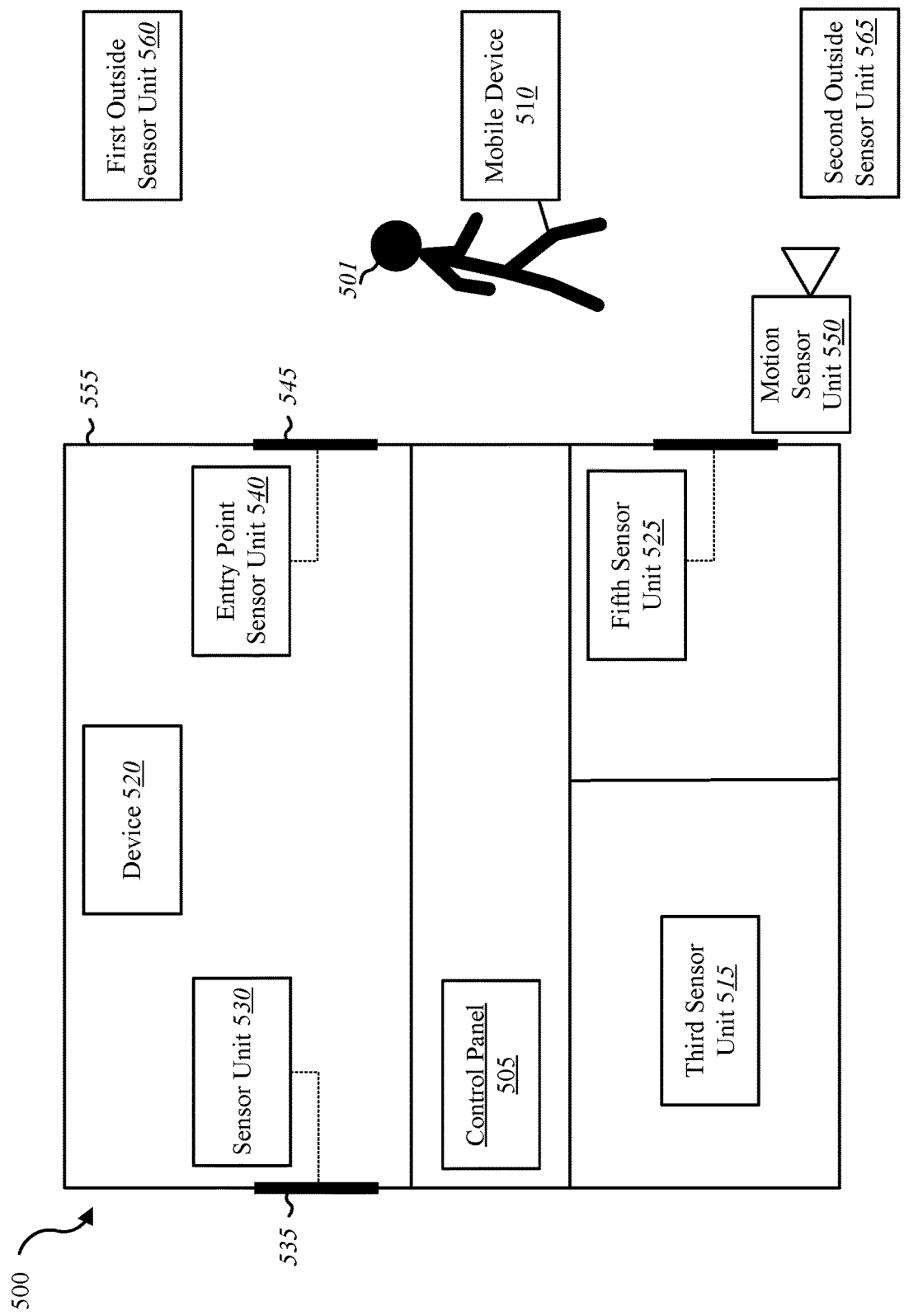
FIG. 5 shows a security and/or home automation system, in accordance with various aspects of this disclosure.

FIG. 5 illustrates an example of a security and/or home automation system 500 in accordance with various aspects of the disclosure. The system 500 may be related to a structure 555 that may include mobile device 510, control panel 505, first sensor unit 515, device 520, second sensor unit 525, third sensor unit 530, entry point sensor unit 540, sensors related to openings 535 and/or 545, motion sensor unit 550, first outside sensor unit 560, and/or second outside sensor unit 565, and/or other components.

In some embodiments, one or more components of a system (e.g., system 500) may include one or more sensors. These sensors may include, but are not limited to: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system.

In some embodiments, the various sensor units 515, 525-565 may collect data in or around structure 555 pertaining to an activity in or around the structure 555. These sensor units 515, 525-565 may transmit the collected data to control panel 505, where the control panel 505 may determine a recommended action based on the monitored activity. The control panel may transmit the recommended action to a user 501, where the user 501 may receive the recommended action via mobile device 510. The user 501 may then send a response to the recommended action, for example, by accepting, rejecting, or modifying the recommended action. Based on the received user input, the control panel 505 may determine a trend in the received user input, where the control panel 505 may subsequently adjust the performance of a device in the system 500 (e.g., automatically, in response to the user input, in response to a determined trend), such as device 520, based on the determined trend and thereby avoiding providing future recommended actions to the user.

Figure 6:
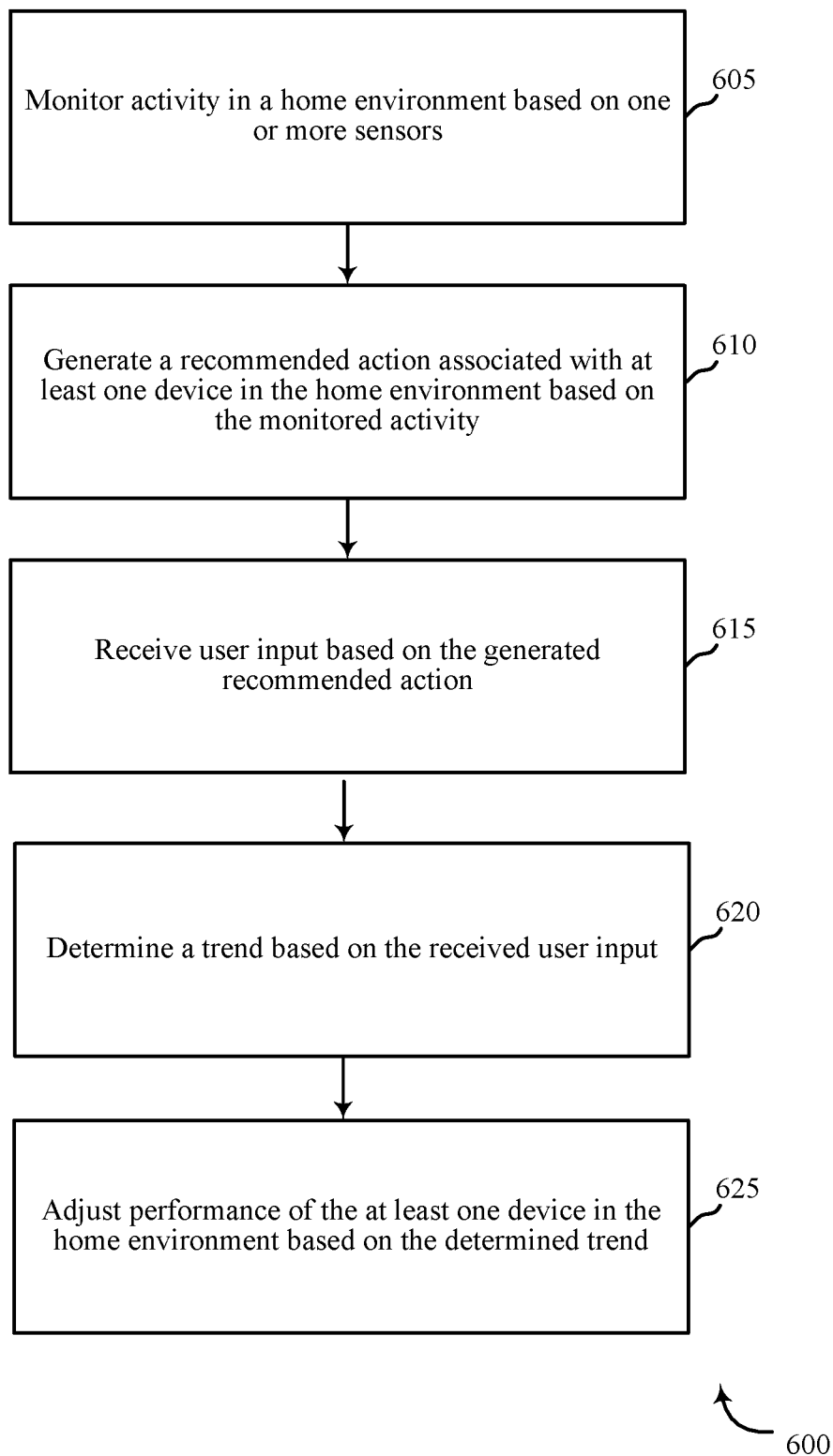
FIGS. 6 and 7 are flow charts illustrating examples of a method relating to a security and/or automation system, in accordance with various aspects of this disclosure.

FIG. 6 is a flow chart illustrating an example of a method 600 for custom rule generation for a device in a home automation system, in accordance with various aspects of the present disclosure. For clarity, the method 600 is described below with reference to aspects of one or more of the control panels described with reference to FIGS. 1-5. In some examples, a control panel may execute one or more sets of codes to control the functional elements of the home automation system to perform the functions described below. Additionally or alternatively, the control panel may perform one or more of the functions described below using special-purpose hardware.

At block 605, the method 600 may include monitoring an activity of a device in a home environment. The monitoring may be performed via various types of sensor units located throughout the home environment. In some embodiments, the sensor units may be any device which may detect any type of device data in a home environment and that is able to wirelessly connect to the home automation system. For example, a doorbell camera, smart thermometer, a security camera, a motion detector, phones, computers, or a control panel of the home automation system, may be used to collect and transmit device activity data.

At block 610, the method 600 may include generating a recommended action associated with at least one device in the home environment based on the monitored activity.

At block 615, the method 600 may include receiving user input based on the generated recommended action. The user input may be an acceptance of the recommended action, a rejection of the recommended action, or a modification of the recommended action. In some embodiments, the user input may additionally or alternatively include context data associated with at least one device.

At block 620, the method 600 may include determining a trend based on the received user input. The trend may be based on a single user input or multiple user inputs, and may be associated with the at least one device or with various other devices in the home environment, such as other devices having a similar device type or performing a similar activity to that of the at least one device.

At block 625, the method 600 may include adjusting the performance of the at least one device in the home environment based on the determined trend. Adjusting the performance of the device may include adjusting a power level of the at least one device, initiating an action of the at least one device, ceasing an action of the at least one device, adjusting a performance threshold of the at least one device, or a combination thereof.

The operations at blocks 605-625 may be performed using the custom rule generation component 215 described with reference to FIGS. 2-4.

Thus, the method 600 may provide for custom rule generation relating to automation/security systems. It should be noted that the method 600 is just one implementation and that the operations of the method 600 may be rearranged or otherwise modified such that other implementations are possible.

Figure 7:
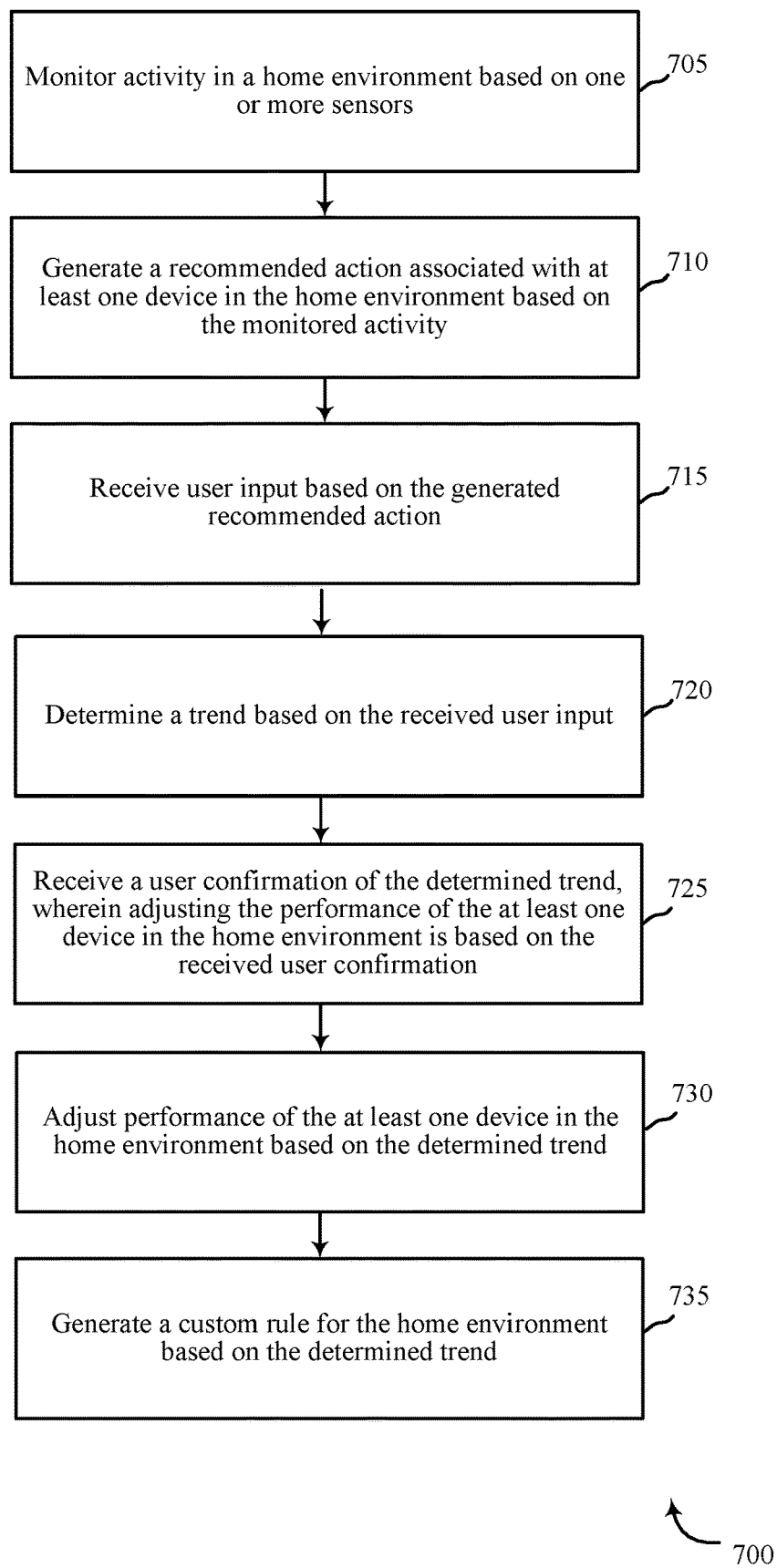

FIG. 7 is a flow chart illustrating an example of a method 700 for custom rule generation for a device in a home automation system, in accordance with various aspects of the present disclosure. For clarity, the method 700 is described below with reference to aspects of one or more of the control panels described with reference to FIGS. 1-5. In some examples, a control panel may execute one or more sets of codes to control the functional elements of the home automation system to perform the functions described below. Additionally or alternatively, the control panel may perform one or more of the functions described below using special-purpose hardware.

At block 705, the method 700 may include monitoring an activity of a device in a home environment, which may be based on one or more sensors. The monitoring may be an example of block 605 of method 600.

At block 710, the method 700 may include generating a recommended action associated with at least one device in the home environment based on the monitored activity. The generating may be an example of block 610 of method 600.

At block 715, the method 700 may include receiving user input based on the generated recommended action. The receiving may be an example of block 615 of method 600.

At block 720, the method 700 may include determining a trend based on the received user input. The determining may be an example of block 620 of method 600.

At block 725, the method 700 may include receiving user confirmation of the determined trend. In some examples, the adjusting the performance of the at least one device may be based on this received user confirmation.

At block 730, the method 700 may include adjusting the performance of the at least one device in the home environment based on the determined trend. The adjusting may be an example of block 625 of method 600.

At block 735, the method 700 may include generating a custom rule based on the determined trend.

The operations at blocks 705-735 may be performed using the custom rule generation component 215 described with reference to FIGS. 2-4.

Thus, the method 700 may provide for custom rule generation relating to automation/security systems. It should be noted that the method 700 is just one implementation and that the operations of the method 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a home automation system, comprising:
   monitoring, via a control panel of the home automation system, power data of a device associated with a group of devices in a home environment based at least in part on one or more sensors, the power data corresponding to a power output of the device;
   identifying a location of the device associated with the group of devices in the home environment;
   applying a weighting factor to the power data of the device based at least in part on the location of the device in the home environment and occupancy data related to the location of the device in the home environment;
   correlating the power data of the device, the location of the device in the home environment, and a device type of the device with power data of other devices associated with the group of devices, device types of the other devices, and locations of the other devices in the home environment;
   determining a power efficiency of the device based at least in part on the correlating;
   generating, via the control panel of the home automation system, a recommended action for the device associated with the group of devices to be power efficient based at least in part on the determining;
   receiving, at the control panel of the home automation system, user input based at least in part on the generated recommended action;
   determining, via the control panel of the home automation system, a trend of actions and corresponding timing of the actions based at least in part on the received user input; and
   automatically adjusting, via the control panel of the home automation system, performance of the group of devices including the device in the home environment based at least in part on a setting to enable performance adjustment of all devices in the group of devices using the determined trend of actions and corresponding timing of the actions, and based at least in part on an absence of receiving additional user input from a user, at the control panel, during a temporal period prior the adjustment.

2. The method of claim 1, further comprising:
   generating a custom rule for the home environment based at least in part on the determined trend.

3. The method of claim 1, wherein the recommended action is generated from a set of recommended actions.

4. The method of claim 3, further comprising:
   updating the set of recommended actions based at least in part on the received user input.

5. The method of claim 1, further comprising:
   receiving a user confirmation of the determined trend, wherein adjusting the performance of the group of devices including the device in the home environment is based at least in part on the received user confirmation.

6. The method of claim 1, wherein the user input comprises context data of the device associated with the group of devices, a characterization of the monitored data, or a combination thereof.

7. The method of claim 6, wherein the context data comprises a device identifier, a device type, a device location, or a combination thereof.

8. The method of claim 1, wherein adjusting the performance of the group of devices including the device comprises adjusting a power level of the group of devices including the device, initiating an action of the group of devices including the device, ceasing an action of the group of devices including the device, adjusting a performance threshold of the group of devices including the device, or a combination thereof.

9. The method of claim 1, further comprising
   readjusting the performance of the group of devices including the device based at least in part on the received user input.

10. The method of claim 1, wherein monitoring the data in the home environment comprises detecting the power output of the device, detecting a radio frequency communication emitted from the device, sensing biometric data, detecting noise levels, or a combination thereof.

11. The method of claim 1, wherein the user input comprises a set of inputs received over a predetermined period.

12. An apparatus for a home automation system, comprising:

a processor;

memory in electronic communication with the processor; and instructions stored in the memory and operable, when executed by the processor, to cause the apparatus to:

monitor, via the apparatus of the home automation system, power data of a device associated with a group of devices in a home environment based at least in part on one or more sensors, the power data corresponding to a power output of the device;

identify a location of the device associated with the group of devices in the home environment;

apply a weighting factor to the power data of the device based at least in part on the location of the device in the home environment and occupancy data related to the location of the device in the home environment;

correlate the power data of the device, the location of the device in the home environment, and a device type of the device with power data of other devices associated with the group of devices, device types of the other devices, and locations of the other devices in the home environment;

determine a power efficiency of the device based at least in part on the correlating;

generate, via the apparatus of the home automation system, a recommended action for the device associated with the group of devices to be power efficient based at least in part on the determining;

receive, at the apparatus of the home automation system, user input based at least in part on the generated recommended action;

determine, via the apparatus of the home automation system, a trend of actions and corresponding timing of the actions based at least in part on the received user input; and automatically adjust, via the apparatus of the home automation system, performance of the group of devices including the device in the home environment based at least in part on a setting to enable performance adjustment of all devices in the group of devices using the determined trend of actions and corresponding timing of the actions, and based at least in part on an absence of receiving additional user input from a user, at the control panel, during a temporal period prior the adjustment.

13. The apparatus of claim 12, wherein the instructions are further executable by the processor to:

generate a custom rule for the home environment based at least in part on the determined trend.

14. The apparatus of claim 12, wherein the recommended action is generated from a set of recommended actions.

15. The apparatus of claim 14, wherein the instructions are further executable by the processor to:

update the set of recommended actions based at least in part on the received user input.

16. The apparatus of claim 12, wherein the instructions are further executable by the processor to:

receive a user confirmation of the determined trend, wherein adjusting the performance of the group of devices including the device in the home environment is based at least in part on the received user confirmation.

17. The apparatus of claim 12, wherein the user input comprises context data of the device associated with the group of devices, a characterization of the monitored data, or a combination thereof.

18. The apparatus of claim 17, wherein the context data comprises a device identifier, a device type, a device location, or a combination thereof.

19. The apparatus of claim 12, wherein adjusting the performance of the group of devices including the device comprises adjusting a power level of the group of devices including the device, initiating an action of the group of devices including the device, ceasing an action of the group of devices including the device, adjusting a performance threshold of the group of devices including the device, or a combination thereof.

20. A non-transitory computer readable medium storing code for a home automation system, the code comprising instructions executable by a processor to:

monitor, via a control panel of the home automation system, power data of a device associated with a group of devices in a home environment based at least in part on one or more sensors, the power data corresponding to a power output of the device;

identify a location of the device associated with the group of devices in the home environment;

apply a weighting factor to the power data of the device based at least in part on the location of the device in the home environment and occupancy data related to the location of the device in the home environment;

correlate the power data of the device, the location of the device in the home environment, and a device type of the device with power data of other devices associated with the group of devices, device types of the other devices, and locations of the other devices in the home environment;

determine a power efficiency of the device based at least in part on the correlating;

generate, via the control panel of the home automation system, a recommended action for the device associated with the group of devices to be power efficient based at least in part on the determining;

receive, via the control panel of the home automation system, a trend of actions and corresponding timing of the actions based at least in part on the generated recommended action;

determine, via the control panel of the home automation system, a trend of actions and corresponding timing of the actions based at least in part on the received user input; and automatically adjust, via the control panel of the home automation system, performance of the group of devices including the device in the home environment based at least in part on a setting to enable performance adjustment of all devices in the group of devices using the determined trend of actions and corresponding timing of the actions, and based at least in part on an absence of receiving additional user input from a user, at the control panel, during a temporal period prior the adjustment.

* * * * *